(12) United States Patent
Ogawa et al.

(10) Patent No.: US 7,540,563 B2
(45) Date of Patent: Jun. 2, 2009

(54) SEAT

(76) Inventors: Taro Ogawa, 1-3-52 Kojima Ajinokami, Kurashiki, Okayama 711-0917 (JP); Takao Komatsubara, 513 Tsurajima Tsurajima-cho, Kurashiki, Okayama 712-8011 (JP); Takashi Honma, 1205 Kojima Yanaida-cho, Kurashiki, Okayama 711-0936 (JP)

( * ) Notice: Subject to any disclaimer, the term of this patent is extended or adjusted under 35 U.S.C. 154(b) by 0 days.

(21) Appl. No.: 11/434,684

(22) Filed: May 15, 2006

(65) Prior Publication Data

US 2006/0284470 A1    Dec. 21, 2006

(30) Foreign Application Priority Data

Jun. 7, 2005    (JP)    ............................. 2005-167373

(51) Int. Cl.
*B60N 2/42* (2006.01)
(52) U.S. Cl. ............................. 297/216.13; 297/452.18
(58) Field of Classification Search ............ 297/452.18, 297/216.14, 216.13, 216.12
See application file for complete search history.

(56) References Cited

U.S. PATENT DOCUMENTS 5,791,738 A * 8/1998 Niezoldt ................. 297/452.18
6,398,300 B1 * 6/2002 Young .................... 297/216.13
6,471,292 B1 * 10/2002 Sundgren et al. ........ 297/216.13
6,926,358 B2 * 8/2005 Fujita et al. .......... 297/216.14 X

FOREIGN PATENT DOCUMENTS

WO    WO 9418871 A1 *    9/1994

* cited by examiner

Primary Examiner—Anthony D Barfield
(74) Attorney, Agent, or Firm—Renner, Kenner, Greive, Bobak, Taylor & Weber

(57) ABSTRACT

A seat according to this invention comprises a seat part and a backrest attached to a rear side of the seat part. The seat part comprises a cushion attached to a pair of side supporting frame members connected with each other. The backrest comprises a cushion attached to an inverse U shaped back frame. Each end of the inverse U shaped back frame is connected to each rear end of the side supporting frame members of the seat part. The inverse U shaped back frame comprises side supporting parts that are positioned in parallel and a top supporting part that connects top ends of the side supporting parts. Lower ends of side supporting parts are connected to rear ends of the side supporting frame members of the seat part via lower attaching parts, respectively. Each lower attaching part has an ear part that projects frontward. Supporting members connect between the side supporting parts and the ear parts of the lower attaching parts, respectively. According to this invention, a rearward tilting of its backrest can be restrained and absorb impact energy when a rear impact acts on the seat.

12 Claims, 14 Drawing Sheets

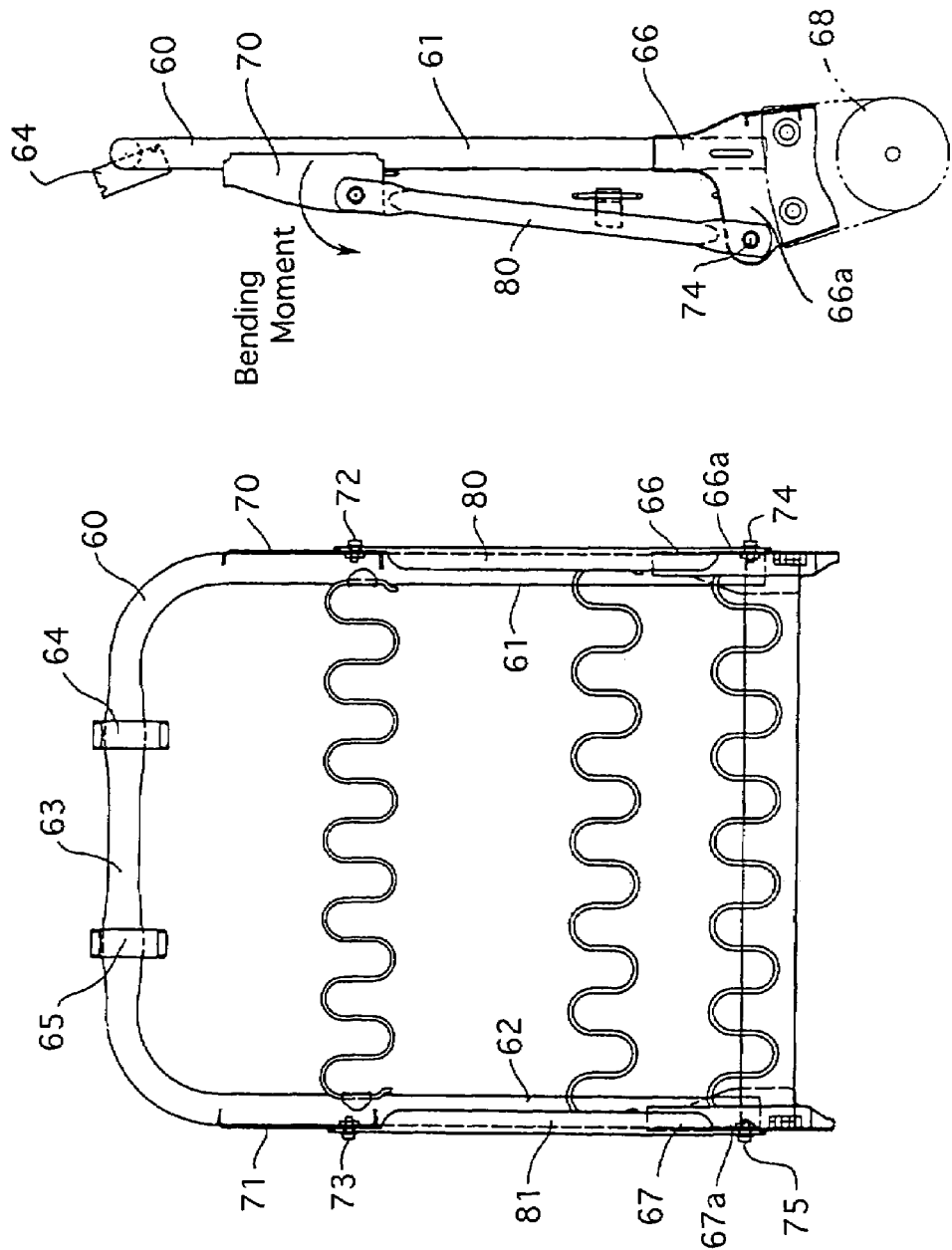

SEAT

BACKGROUND OF THE INVENTION

This invention relates to a seat of a passenger vehicle such as an automobile. In particular, this invention relates to such a seat that considers its safety when a rear impact acts thereon.

FIG. 1 shows a bucket seat typically installed in a passenger vehicle such as an automobile. The seat 10 comprises a seat part 11, a backrest 12 attached to the rear side of the seat part 11 and a headrest 13 attached to the top part of the backrest 12. The seat part 11 and the backrest 12 have cushions, respectively. The cushion of the backrest 12 supports a back of a passenger sat on the cushion of the seat part 11.

FIG. 2 shows a conventional frame structure of a seat as shown in FIG. 1. As shown, the frame structure has a bottom frame 20 as a main frame of the seat part 11 and a back frame 40 as a main frame of the backrest 12.

The bottom frame 20 has side supporting frame members 21, 22. One side supporting frame member 21 is positioned opposite to another side supporting frame member 22. Reinforcing members such as beams indicated by numerals 23, 24, 25 connect the side supporting frame members 21, 22 to reinforce the bottom frame 20.

The back frame 40 has side plates 31, 32 that are connected to rear parts of the side supporting frame members 21, 22, respectively, and top parts of these side plates 31, 32 are connected by an inverse U shaped member 34 formed of, for example, a bar or tube. Headrest attaching members 35, 36 are fixed to a top part of the member 34, and the headrest 13 can be attached to the top part of the backrest 12 by passing two legs (not shown) of the headrest 13 through holes of these members 35, 36. As shown, a reinforcing member such as a plate indicated by numeral 41 connects lower parts of the side plates 31, 32 to reinforce the back frame 40.

The seat 10 as shown in FIG. 1 further comprises reclining means 42, 43 for adjusting a tilt angle of the backrest 12 with respect to the seat part 11 (see, for example, Japanese Patent Laying-Open No. 2003-52476).

If a rear impact due to an accidental collision and the like acts on an automobile that installs such a seat and then acts on a passenger sat on the seat, the passenger will be injured. If a hard impact acts thereon, a backrest of the seat will be tilted rearward and the passenger will slide up along the backrest, and as a result, the passenger will suffers a serious injury.

Recently, a seat of an automobile has been provided with a headrest as shown in FIG. 1 in order to protect a passenger from such an impact due to an accidental collision. That is, if there is no headrest, the passenger's head will be tilted (or rotated) rearward and the passenger's neck suffers a serious damage due to the rear impact. Thus, the headrest serves to protect the passenger's head and neck so that the passenger does not suffer whiplash injury due to the rear impact.

The headrest can hold the head to restrain a large rearward tilting (or rotation) of the head. However, disadvantageously, if the impact energy is larger, the backrest will be tilted rearward and the passenger will slide up such that the passenger's head rides over the headrest to injure in the passenger's neck and the passenger may be thrown out of the seat.

In addition, if the front seat is tilted rearward when a rear impact acts thereon, a rear space behind the front seat becomes smaller and a passenger sat on a rear seat will be injured.

Accordingly, in automotive industry, it is a technical problem to improve a passenger's safety when a rear impact acts on a seat.

SUMMARY OF INVENTION

It is therefore an object of this invention to provide a seat that can restrain a rearward tilting of its backrest and absorb impact energy when a rear impact acts thereon.

A seat according to this invention comprises a seat part and a backrest attached to a rear side of the seat part. The seat part comprises a cushion attached to a pair of side supporting frame members connected with each other. The backrest comprises a cushion attached to an inverse U shaped back frame. Each end of the inverse U shaped back frame is connected to each rear end of the side supporting frame members of the seat part. The inverse U shaped back frame comprises side supporting parts that are positioned in parallel and a top supporting part that connects top ends of the side supporting parts. Lower ends of side supporting parts are connected to rear ends of the side supporting frame members of the seat part via lower attaching parts, respectively. Each lower attaching part has an ear part that projects frontward. Supporting members connect between the side supporting parts and the ear parts of the lower attaching parts, respectively.

When a rear impact acts on the seat of this invention so as to tilt rearward the backrest comprising the inverse U shaped back frame that attaching the cushion, this rearward tilting can be restrained by the supporting members that connect between the side supporting parts and the ear parts of the lower attaching parts, respectively. The side supporting parts of the inverse U shaped back frame are deformed when the impact acts thereon, so that the impact energy is mainly absorbed in the side supporting parts.

As above, the rearward tilting of the inverse U shaped back frame can be restrained so as to prevent a passenger from sliding up, and thus, the seat according to this invention can improve the holding ability of passenger. In addition, the rearward tilting of the inverse U shaped back frame can be restrained, and thus, a rear space of this seat can be almost maintained so as to improve the safety of a passenger sat on a rear seat.

BRIEF DESCRIPTION OF THE DRAWINGS

FIG. 4A shows a front view of the frame structure of the backrest shown in FIG. 3.

FIG. 4B shows a side view of the frame structure of the backrest shown in FIG. 3.

DETAILED DESCRIPTION OF THE INVENTION

Figure 1:
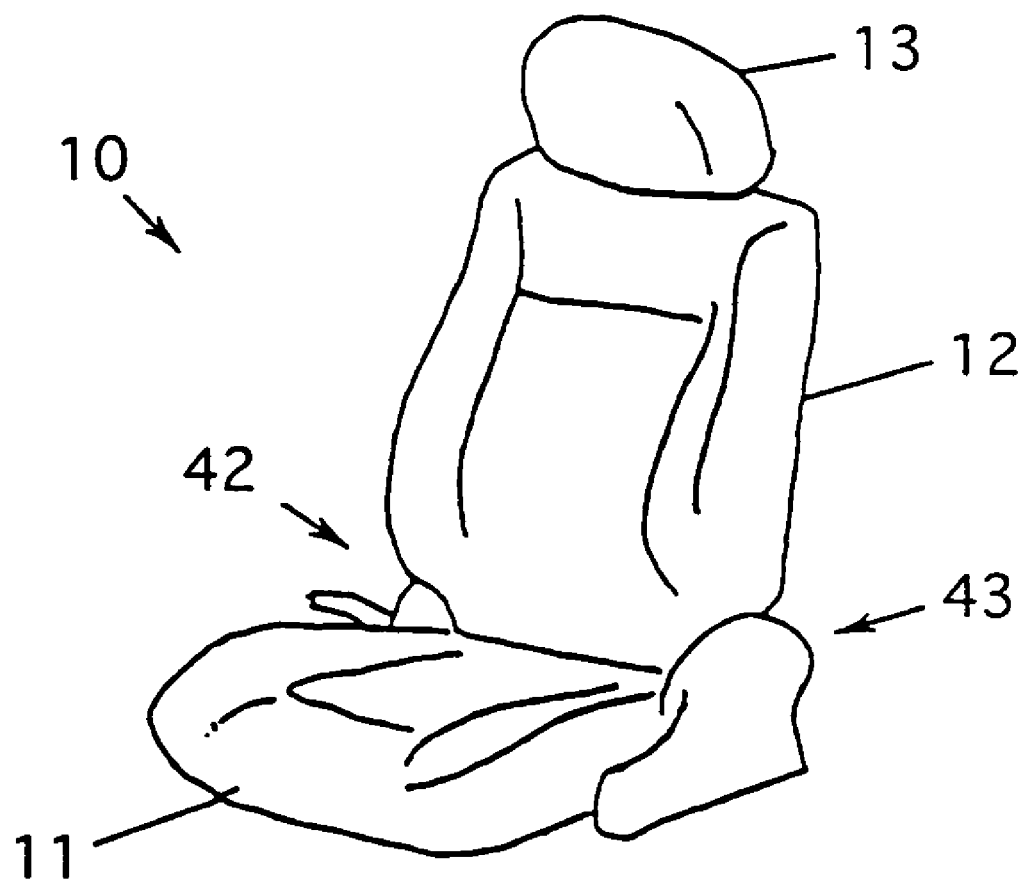
FIG. 1 shows a perspective view of a bucket seat of an automobile.

A seat according to this invention includes a seat part and a backrest as well as a seat shown in FIG. 1.

Figure 2:
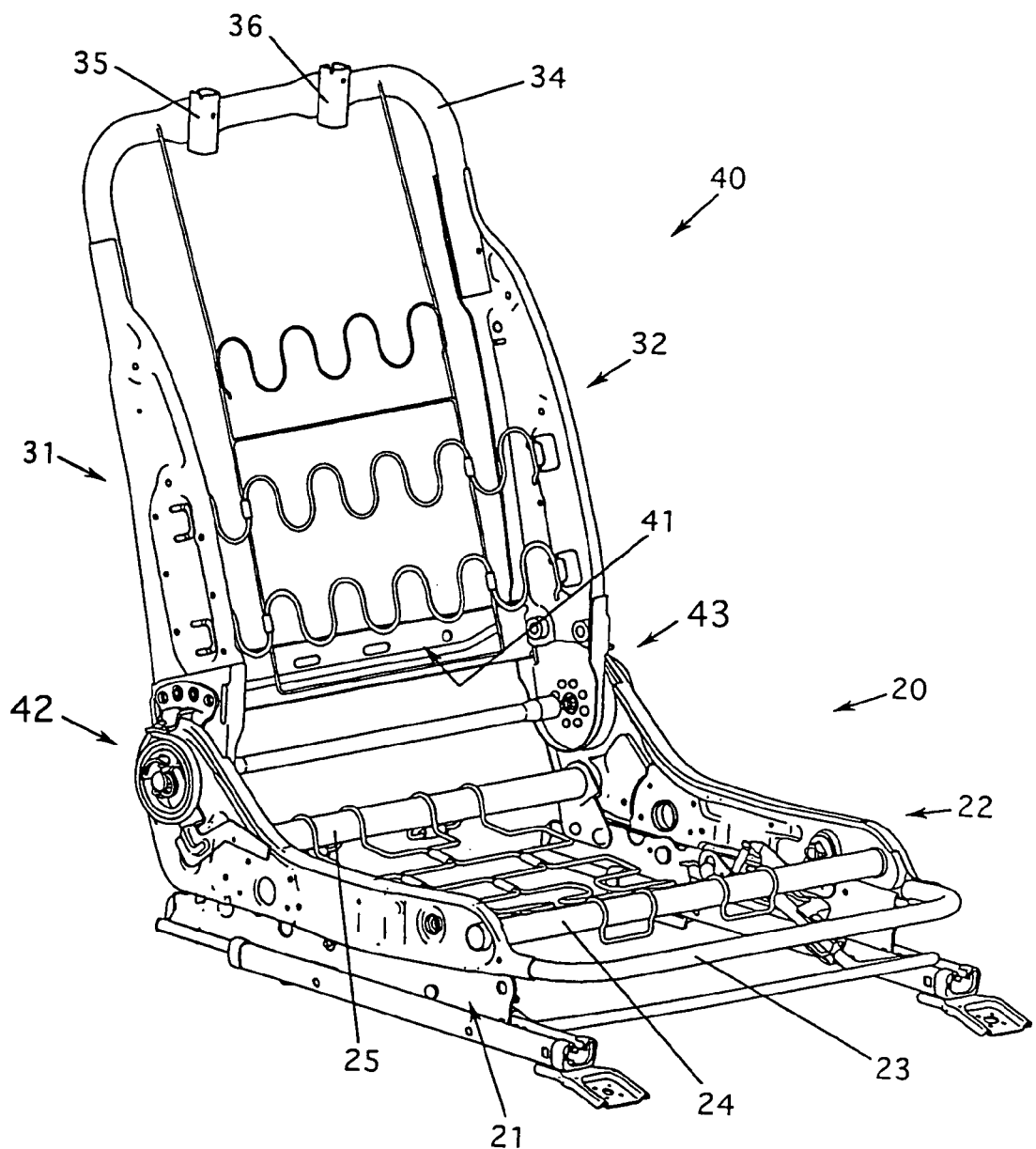
FIG. 2 shows a perspective view of a frame structure of a seat as shown in FIG. 1.

The seat according to this invention effectively restrains a rearward tilting of a back frame of the backrest when a rear impact acts on the seat and absorbs the impact energy mainly in the back frame. Thus, the characteristic of this invention is a frame structure of the backrest, as explained below, and the seat part as one component of the seat according to this invention is substantially the same as that of the prior art seat. (The seat part used in this invention comprises a pair of side supporting frame members that are connected with each other and a cushion attached on the side supporting frame members as shown in FIG. 2, as well as that of the prior art seat.) Therefore, the frame structure of the backrest of the seat according to this invention is explained in detail below.

Figure 3:
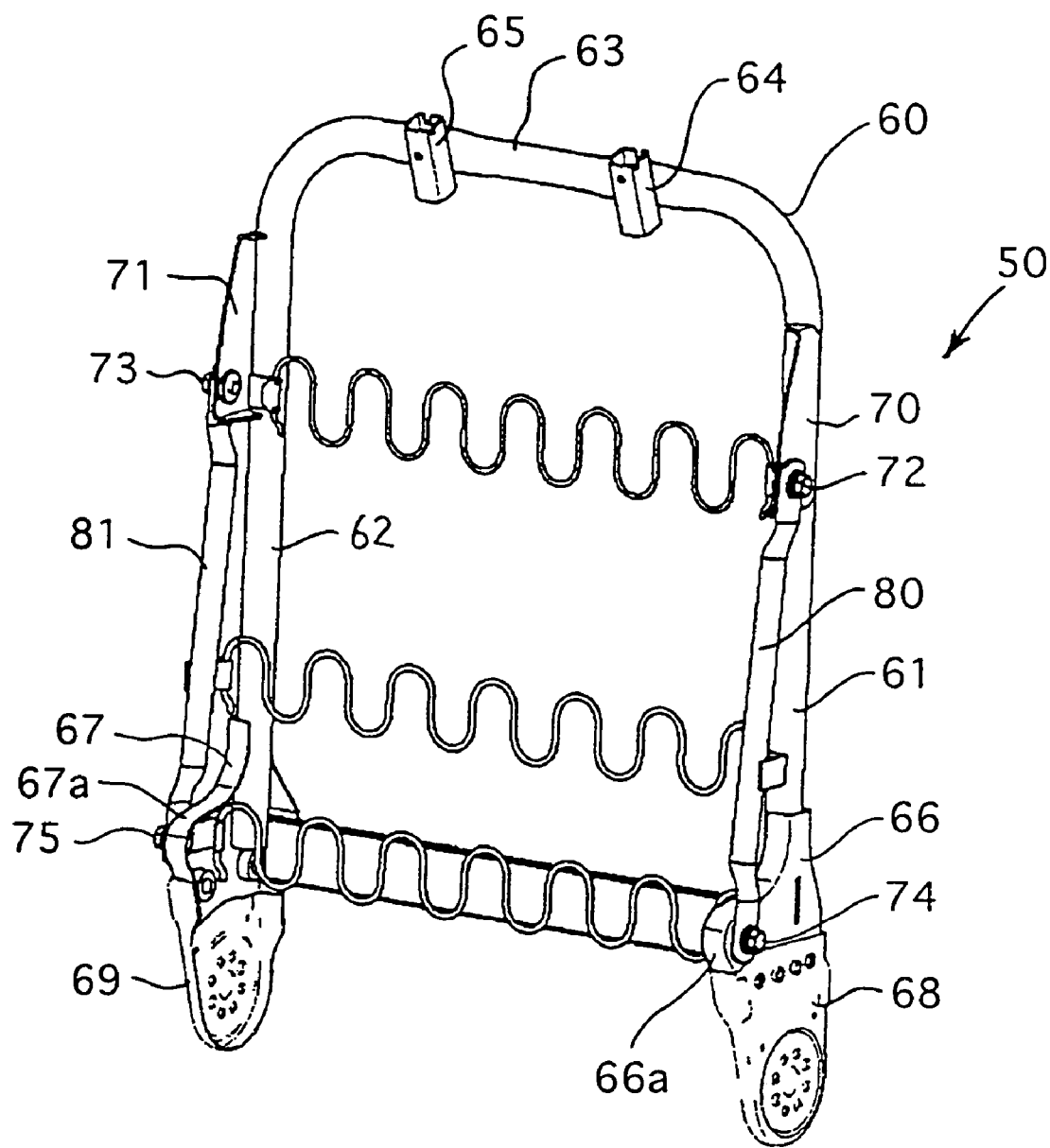
FIG. 3 shows a perspective view of a frame structure of a backrest of a seat according to this invention.

FIG. 3 shows a perspective view of a frame structure of a backrest 50 according to this invention. (In this figure, while a frame structure of a seat part of the seat according to this invention is eliminated, the backrest 50 is attached to a seat part having a bottom frame as indicated numeral 20 shown in FIG. 2.) FIGS. 4A and 4B show a front view and a side view of a back frame 60 of the backrest 50.

As shown, the shape of this back frame 60 is an inverse U shape, and the back frame 60 comprises side supporting parts 61, 62 that are positioned in parallel and a top supporting part 63 that connects top ends of these side supporting parts 61, 62. The inverse U shaped back frame 60 is formed of a pipe or tube. As shown, headrest-attaching members 64, 65 for attaching a headrest are fixed to the top supporting part 63.

Lower ends of the side supporting parts 61, 62 have lower attaching parts 66, 67, respectively. The lower attaching parts 66, 67 may be integrally formed in the lower end parts of the side supporting parts 61, 62, respectively, or fittings or attachments as the lower attaching parts 66, 67 may be fixed to the lower end parts of the side supporting parts 61, 62, respectively. Each lower attaching part 66, 67 has an ear part 66a, 67a in its front side (i.e. projecting frontward). These lower attaching parts 66, 67 may be fixed to plate members 68, 69 for attaching conventional reclining means, respectively. Alternatively, each of the lower attaching parts 66, 67 may be a part of the reclining means such that the lower attaching parts 66, 67 are integrally formed or provided in the reclining means, so that the lower ends of the side supporting parts 61, 62 can be directly fixed to the reclining means.

As shown, upper attaching parts 70, 71 such as fittings or attachments are provided in upper parts of the side supporting parts 61, 62, respectively, and according to this invention, supporting members 80, 81 are connected between the upper attaching parts 70, 71 and the ear parts 66a, 67a of the lower attaching parts 66, 67, respectively.

The upper ends of the supporting members 80, 81 may be pivotally attached to the outside surfaces of the upper attaching part 70, 71 by use of nuts and bolts 72, 73, respectively. Also, the lower ends of the supporting members 80, 81 may be pivotally attached to the outside surfaces of the ear parts 66a, 67a by use of nuts and bolts 74, 75, respectively. As shown, the supporting members 80, 81 are positioned front sides and outside parts of the side supporting parts 61, 62, respectively.

As an alternative arrangement, the upper attaching parts 70, 71 may be attached inside the upper parts of the side supporting parts 61, 62, respectively, and the lower ends of the supporting members 80, 81 may be attached to the inside surfaces of the ear parts 66a, 67a, respectively, such that the supporting members 80, 81 are positioned front sides and inside parts of the side supporting parts 61, 62, respectively.

FIG. 5 shows a shearing force and a bending moment diagrams of the back frame when a rear impact acts on the seat according to this invention. FIG. 6 shows a shearing force and a bending moment diagrams of a comparative example structure of a back frame that does not have the supporting members 80, 81 that are the characteristic structural members of this invention. Before explaining this invention, a shearing force and a bending moment of this comparative example structure are explained.

Figures 6A, 6B, 6C:
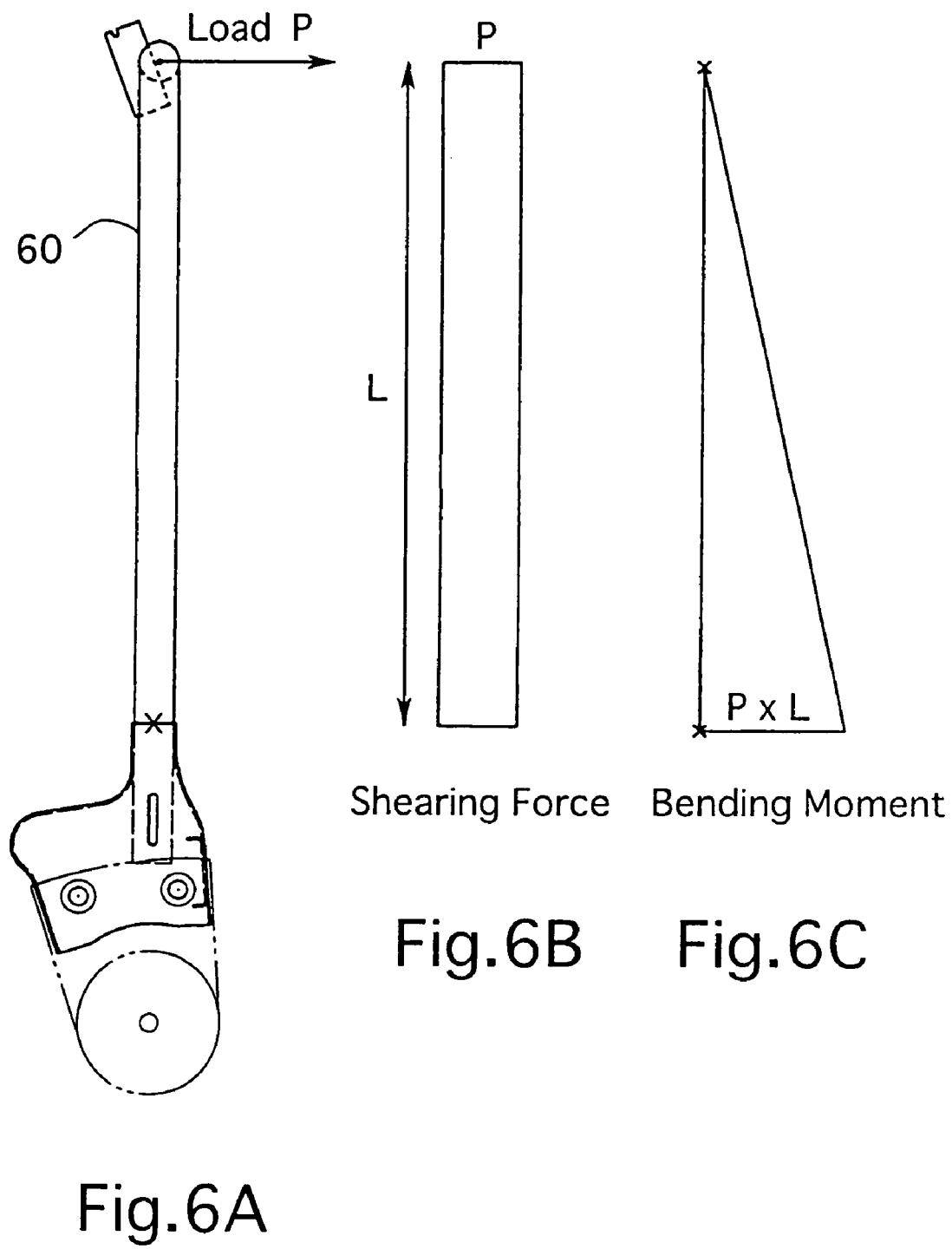
FIG. 6A shows a side view of a frame structure of a backrest without supporting members.
FIG. 6B shows a shearing force diagram of the back frame shown in FIG. 6A when a rear impact force acts on a seat.
FIG. 6C shows a bending moment diagram of the back frame shown in FIG. 6A when a rear impact force acts on a seat.

As shown in FIG. 6A, when a rear impact acts on a seat, a load P is acted rearward to the back frame 60. A constant shearing force as shown in FIG. 6B is produced along the length L of the side supporting part of the back frame 60 by this load P, and as shown in FIG. 6C, the bending moment in clockwise increasing from the top part of the back frame to the lower part (indicated by "x" in FIG. 6A) thereof is produced by this shearing force. Then, by this bending moment, the backrest 50 including this comparative example structure of the back frame 60 is tilted rearward (or in clockwise) with respect to a point indicated by "x" as a center of rotation.

Figures 5A, 5B, 5C:
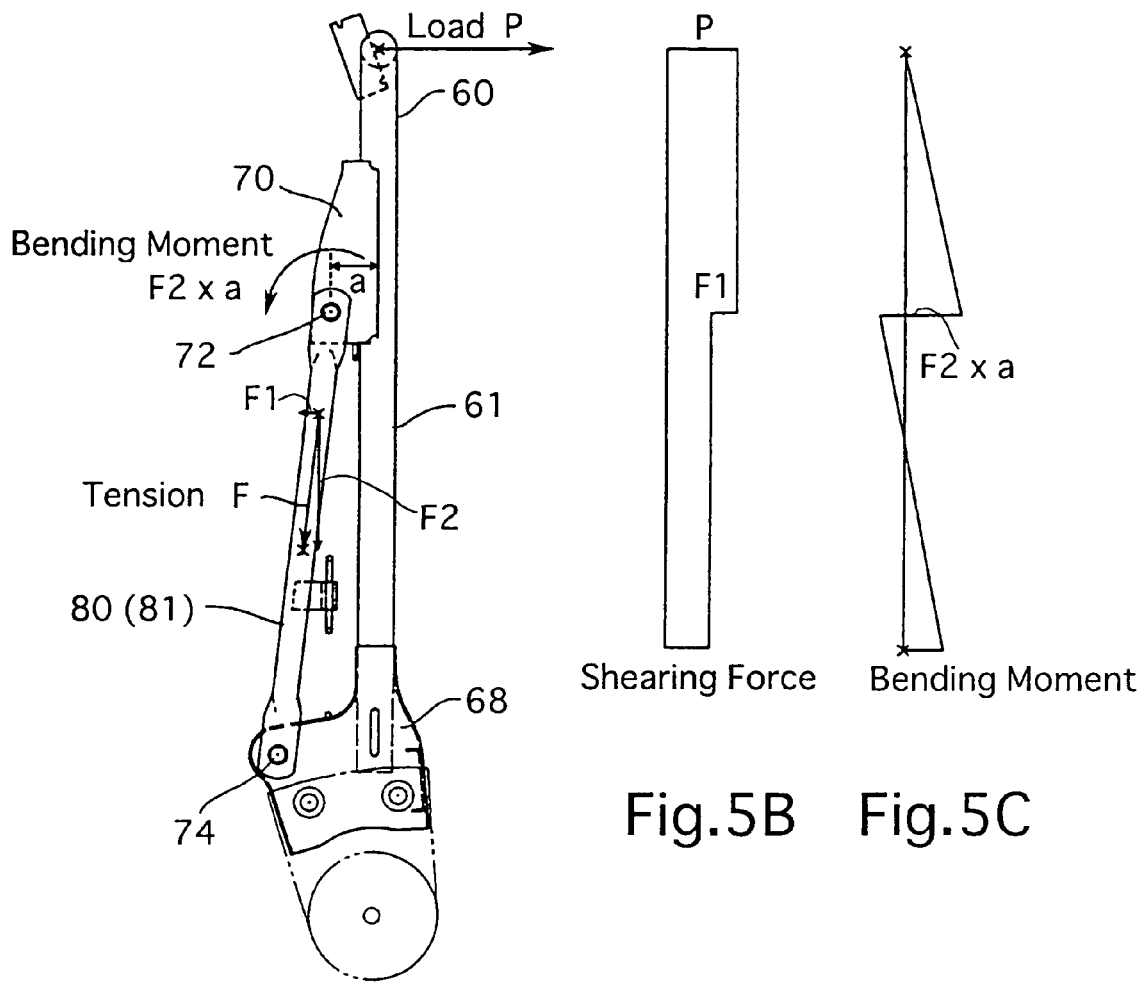
FIG. 5A shows a side view of the frame structure of the backrest shown in FIG. 3.
FIG. 5B shows a shearing force diagram of the back frame shown in FIG. 5A when a rear impact force acts on a seat.
FIG. 5C shows a bending moment diagram of the back frame shown in FIG. 5A when a rear impact force acts on a seat.

In the back frame 60 including the supporting members 80, 81 according to this invention, a tension F as shown in FIG. 5A is produced along the supporting members 80 (81). As a result, the shearing force along the length L of the side supporting part 61 (62) of the back frame 60 due to the load P acting rearward is reduced below a connecting point (indicated as nuts and bolts 72 (73)) by a horizontal component F1 of the tension F.

In addition, as shown in FIG. 5A, a second bending moment in counter clockwise about this connecting point (indicated by numeral(s) 72 (73)) is produced. This second bending moment is expressed such that a vertical component F2 of the tension F times a horizontal distance indicated by "a" between the connecting point 72 (73) and a neutral axis of the side supporting part of the back frame. As shown in FIG. 5C, while the bending moment produced from the top end of the back frame to the connecting point 72 (73) is similar to that of FIG. 6C, the second bending moment in counter clockwise acts at this connecting point such that this second bending moment serves to press the back frame frontward.

As explained above, when a rear impact acts on the back frame 60 (or the backrest 50), a bending moment is produced so as to tilt the backrest 50 rearward, and at the same time, another bending moment is produced about the connecting point (the bolt 72 (73)) so as to press the back frame 60 frontward by incorporation of the supporting members according to this invention.

While actual values of the aforementioned physical parameters such as the tension acting along the supporting member, the shearing force and the bending moments (in clockwise and counter clockwise) are determined depending on a structure of the back frame and a property of each component thereof and a magnitude of the rear impact, the rearward tilting of the backrest can be restrained by incorporation of the supporting members.

Thus, according to this invention, it can be effectively restrain to slide up a passenger sat on a seat along its backrest due to the rearward tilting of the backrest, so that the passenger's head does not ride over a headrest of the seat, and thereby, the passenger's head can be protected.

As explained above, the rearward tilting of the back frame of the backrest can be restrained by incorporation of the supporting members according to this invention. In addition to the above structural characteristic of this invention, impact energy can be absorbed by deformation of the back frame (specially, its side supporting part(s)), as explained below.

Figure 7A:
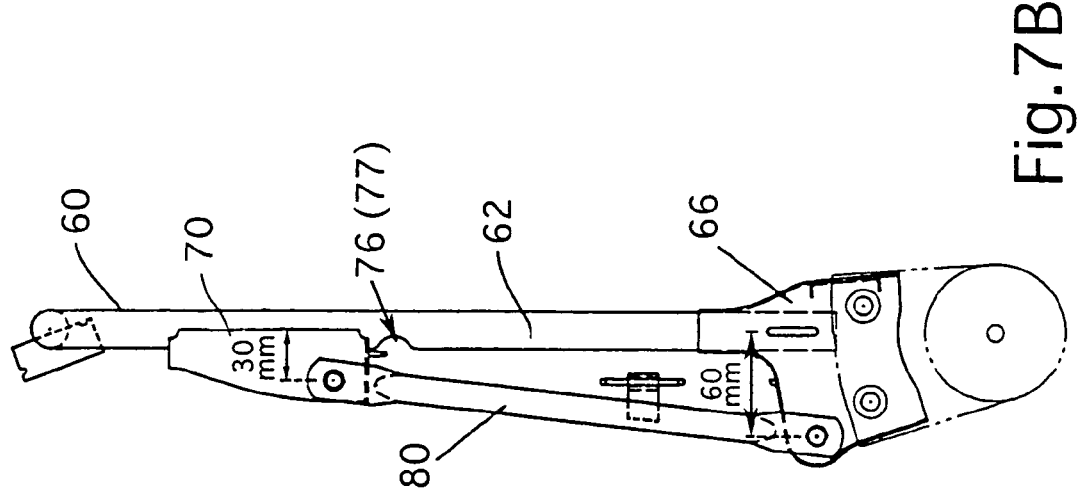
FIG. 7A shows a front view of an alternative frame structure of the back frame shown in FIG. 3 wherein a thinnish part (or a depression part) is formed in the back frame.
Figure 7B:
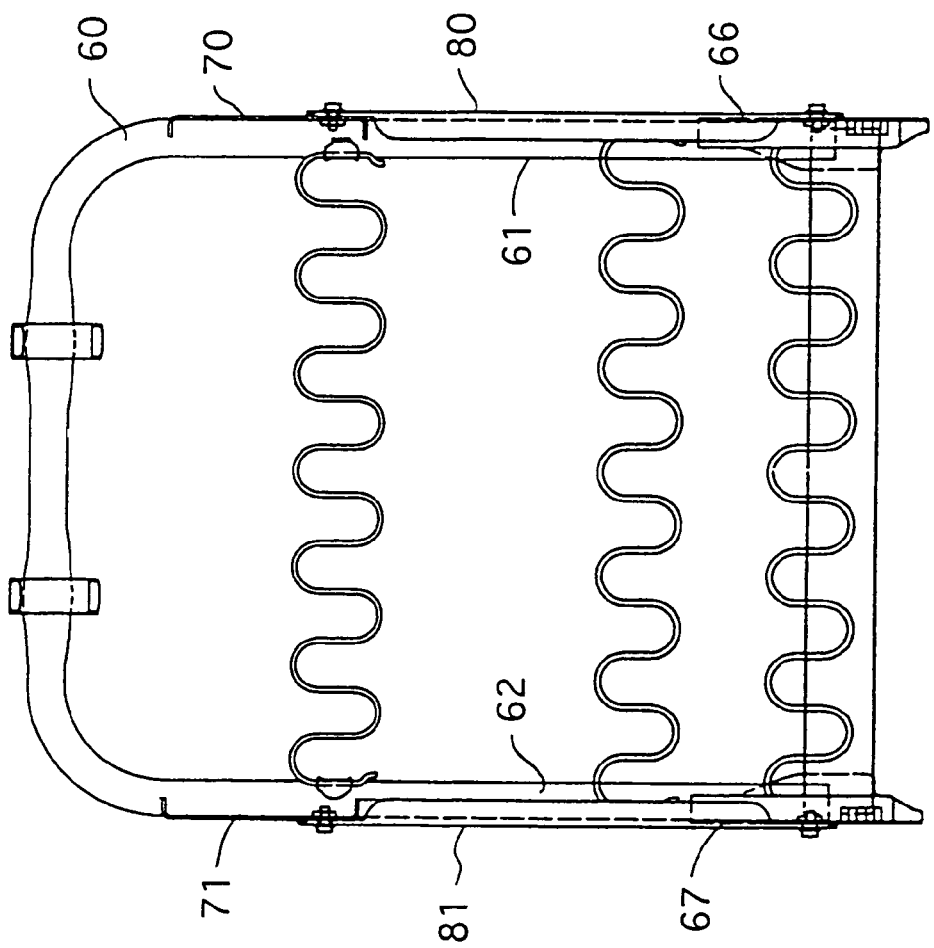
FIG. 7B shows a side view of the alternative frame structure of the back frame shown in FIG. 7A.

FIG. 7 shows another example of this invention. A frame structure of a back frame shown in FIG. 7 is substantially the same as that of FIG. 4, excepting that thinnish (or depression) parts 76 (77) are formed in the side supporting parts 61, 62 between the upper attaching parts 70, 71 and the lower attaching parts 66, 67, respectively. Thereby, when a rear impact acts on the seat, the upper part of the back frame 60 above the thinnish part 76 (77) can be bent frontward easily so that a headrest does not go away from a passenger's head. Thus, when a rear impact acts on the seat, the passenger's head can be held sufficiently by the headrest.

Figure 8:
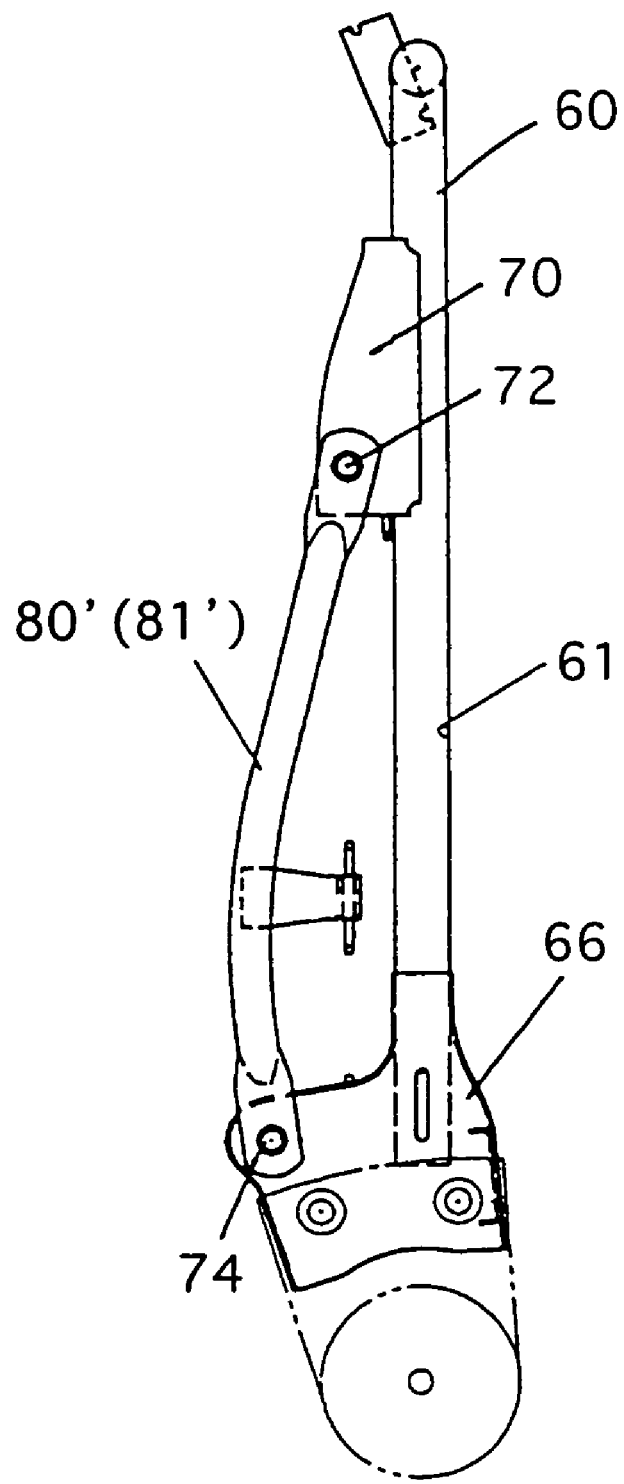
FIG. 8 shows a side view of another example of a frame structure of a back frame according this invention.

FIG. 8 shows an alternative example of the supporting members according to this invention. These supporting members 80' (81') are curved as shown in the figure. When a rear impact acts on the backrest, the curved supporting members extend and thereby absorb impact energy, so that the supporting members support the back frame 60 so as to restrain its rearward tilting. Thus, such curved supporting members can efficiently absorb the impact energy. In this example, the supporting members 80' (81') that are curved frontward are used. Alternatively, such supporting members that are curved rearward may be used.

Figure 9:
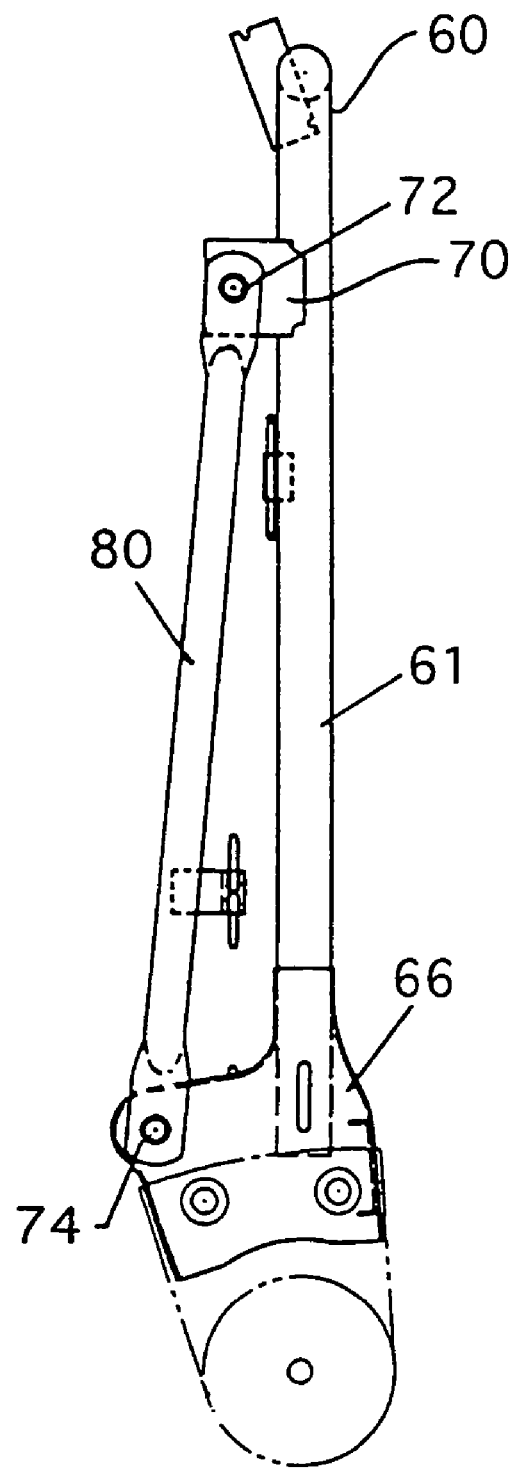
FIG. 9 shows a side view of another example of a frame structure of a back frame according this invention.

FIG. 9 shows another example of this invention. In this example, the upper attaching parts 70 (71) are provided in a much upper part of the side supporting part 61 so as to produce the bending moment in counter clockwise about the much upper connecting point in order to ensure to hold a passenger's head by the headrest. In this example, an angle between the supporting member and the side supporting part of the back frame is smaller so that the bending moment in counter clockwise is smaller.

Figure 10:
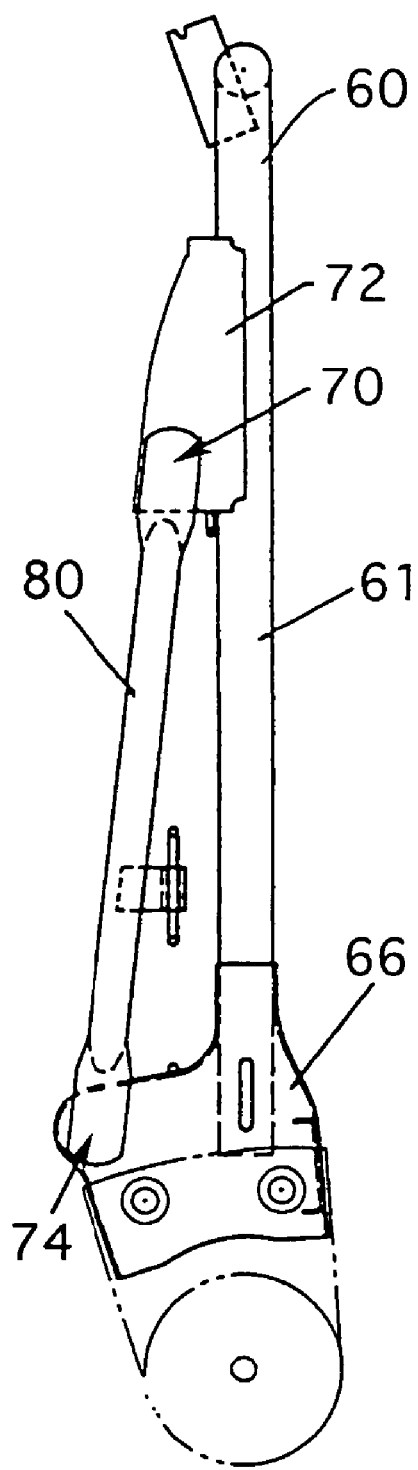
FIG. 10 shows a side view of another example of a frame structure of a back frame according this invention.

FIG. 10 shows another example of this invention. In this example, the upper and lower ends of the supporting members 80 (81) are welded to the upper attaching parts 70 (71) and the lower attaching parts 66 (67), respectively. Such a solid frame structure makes the seat tougher so that the rearward tilting of the backrest can be restrained more.

Figure 11:
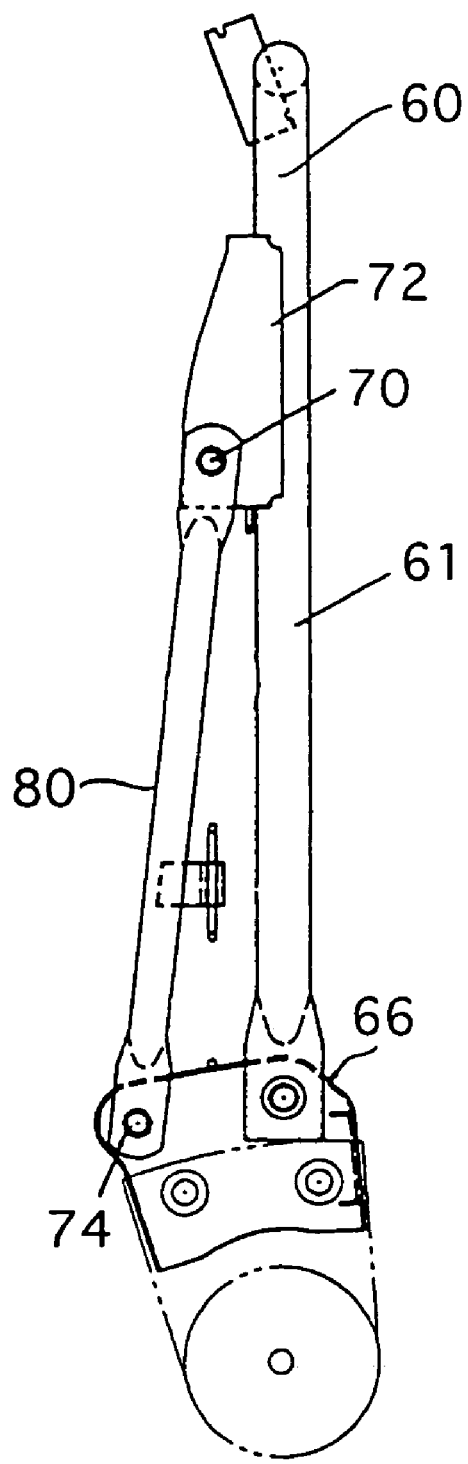
FIG. 11 shows a side view of another example of a frame structure of a back frame according this invention.

Alternatively, in the example of this invention shown in FIG. 11, the upper and lower ends of the supporting members 80 (81) are pivotally connected to the upper attaching parts 70 (71) and the lower attaching parts 66 (67) at the connecting points by use of, for example, bolts and nuts 72, 74 (73, 75), respectively, and the ends of the inverse U shaped back frame 60 are also pivotally connected to the lower attaching parts 66 (67) by use of, for example, bolts and nuts, respectively. Such a frame structure of this alternative example is pliant so that impact energy can be dispersed and absorbed.

EXAMPLE OF THIS INVENTION

A basic frame structure including the supporting members according to this invention is shown in FIGS. 3 and 4. As explained below, a rear impact test of a seat including a backrest according to this invention shown in FIG. 7 was carried out.

The inverse U shaped back frame is formed of a pipe (22.2φ×1.6t), and each supporting member is formed of a pipe (15.1φ×1.4t).

The top ends of the supporting members are pivotally connected to the upper attaching parts by use of bolts and nuts, respectively, and each of their connecting points is positioned frontward from the neutral axis of each of the side supporting parts by 30 mm. The lower ends of the supporting members are also pivotally connected to the lower attaching parts, respectively, and each of their connecting points is positioned frontward from the neutral axis of the side supporting parts by 60 mm.

The back frame is connected to the side supporting frame members of the seat part via reclining means.

Rear Impact Test

The rear impact test was carried out as follows.

|  | Sled Acceleration |
| --- | --- |
| Low Speed Rear Impact Test | 20 km/h |
| High Speed Rear Impact Test | 80 km/h |

Figure 12:
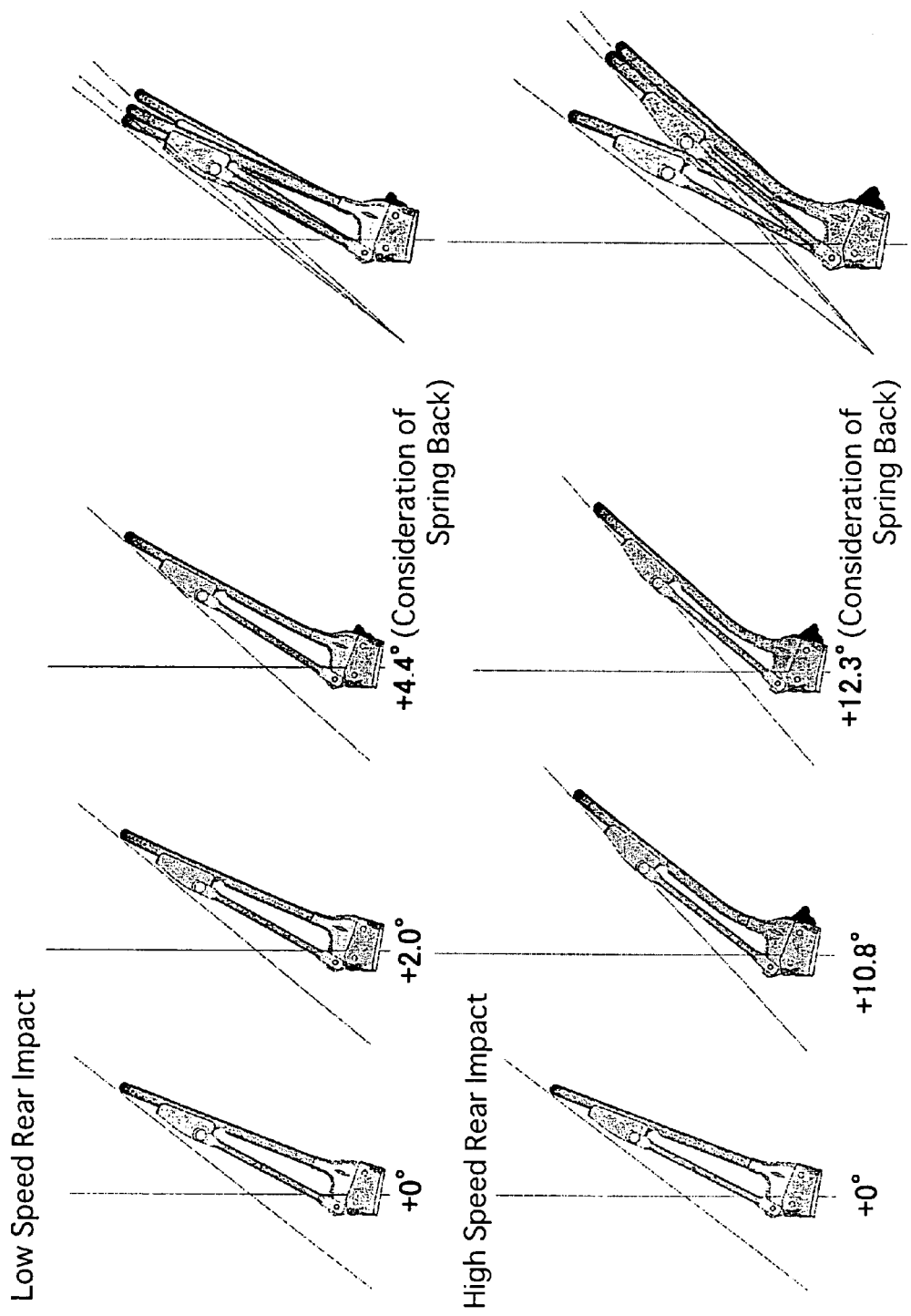
FIG. 12 shows side views of a back frame when a high speed rear impact and a low speed rear impact act on a seat.
Figure 13:
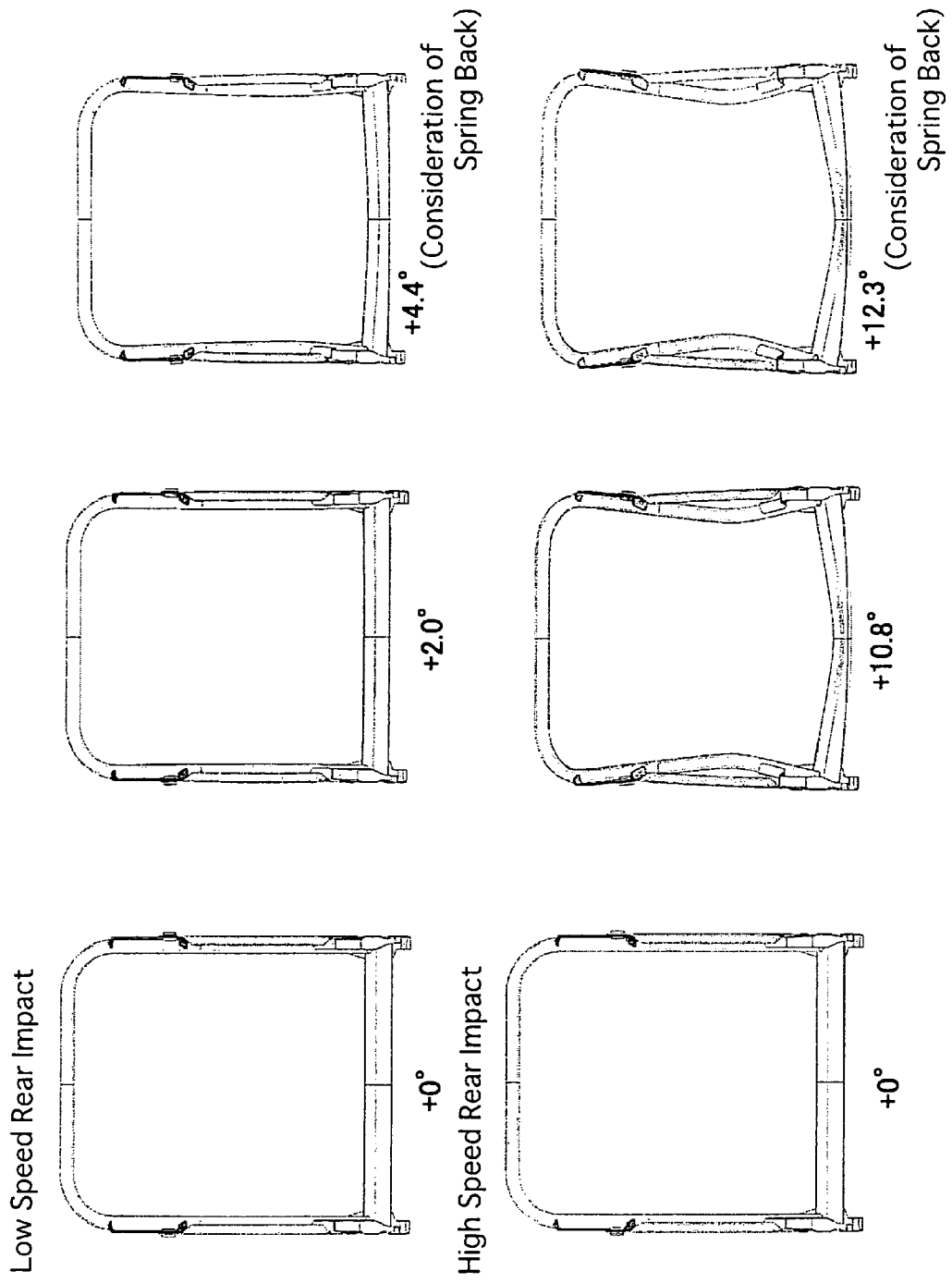
FIG. 13 shows front views of a back-frame when a high speed rear impact and a low speed rear impact act on a seat.
Figure 14:
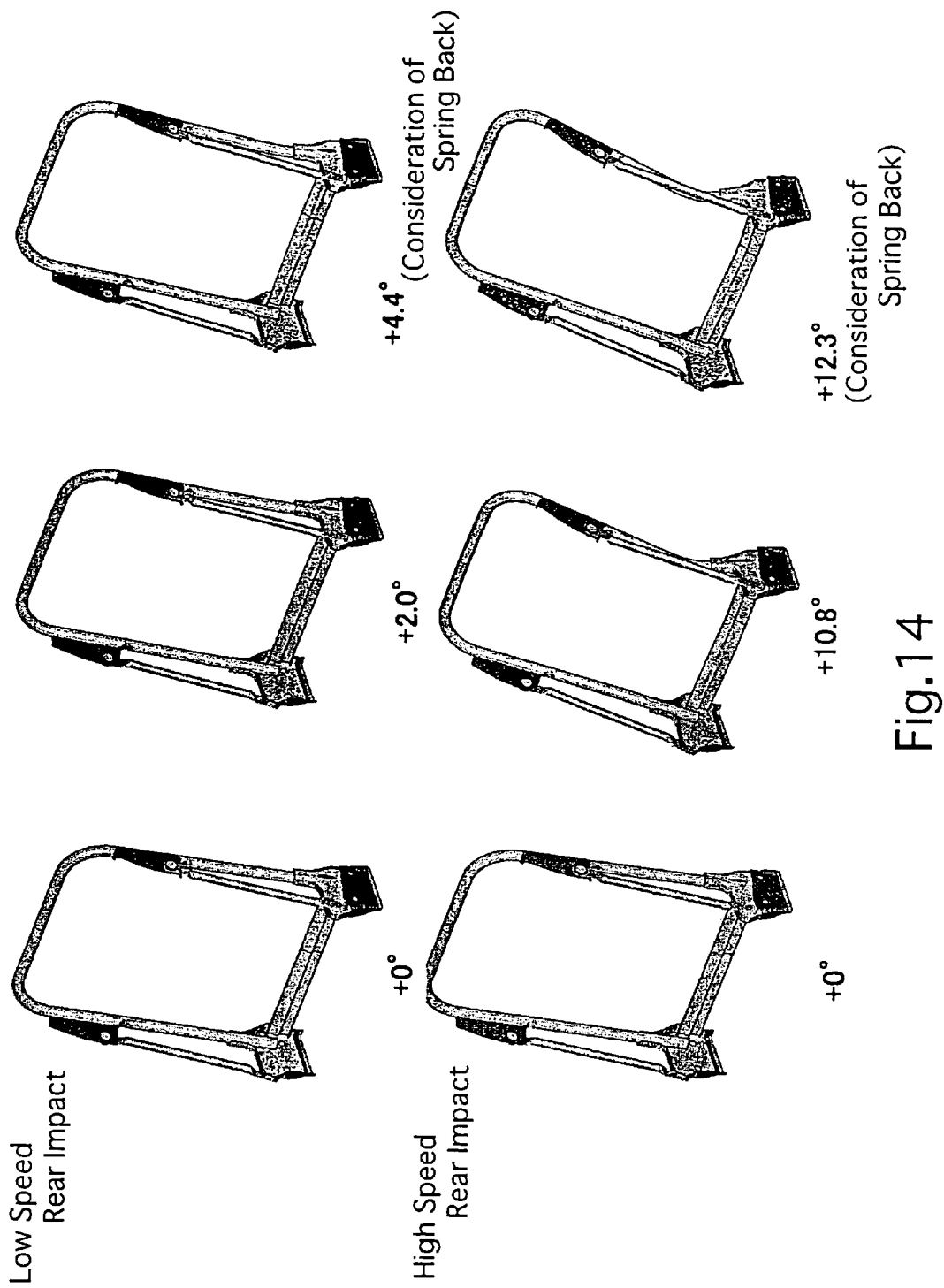
FIG. 14 shows perspective views of a back-frame when a high speed rear impact and a low speed rear impact act on a seat.

FIGS. 12, 13 and 14 show a series of graphically simulated deformations of the back frame in the low speed and high speed impact tests, respectively.

In FIG. 12, the initial rearward tilt angle of the backrest before acting the rear impact is indicated by "+0°", and tilt angles indicated in FIGS. 12-14 are with respect to a baseline on the initial rearward tilt angle.

In the low speed rear impact test, the backrest was tilted rearward until +4.4° with respect to the baseline and was then rebounded frontward due to the elasticity (or spring back) of the seat so that the backrest was finally rearward tilted by +2° with respect to the baseline. The figure set in the most right-hand side shows a drawing composed these deformations.

In the high speed rear impact test, the backrest was rearward tilted until +12.3° with respect to the baseline and was then rebounded frontward due to the elasticity (or spring back) of the seat so that the backrest was finally rearward tilted by +10.8° with respect to the baseline.

FIG. 13 shows front views of a series of graphically simulated deformations of the back frame in the low speed and high speed impact tests. FIG. 14 shows perspective views of a series of graphically simulated deformations of the back frame in the low speed and high speed impact tests.

As seen in FIGS. 13 and 14, the rearward tilting of the back frame can be restrained by incorporation of the supporting members according to this invention.

Evaluation of this Invention and Conventional Types

The above example seat according to this invention and representative types of seats (indicated by letters "A","B", "C" and "D") were evaluated based on the above impact test.

TABLE 1

| Seat | Type A | Type B | Type C | Type D | Example |
|---|---|---|---|---|---|
| NIC (m$^2$/s$^2$) | 12.51 | 9.77 | 26.23 | 24.77 | 7.39 |

NIC (Neck Injury Criterion) is desirably less than and equal to 15. Thus, as seen, the seat (indicated by "Example" in Table 1) according to this invention has a remarkably improved result.

Evaluation of High Speed Rear Impact Test

The above high speed rear impact test was carried out for each of these representative types of seats and the above inventive seat. Rearward tilt angles (with respect to a vertical line common to all seats) and behaviors of dummies during the test were as follows.

TABLE 2

| | Tilt Angle | Behavior of Dummy |
|---|---|---|
| Type A | 38.5° | The dummy was sled up along the backrest. Its head rid over the headrest and was rotated rearward. |
| Type B | 57.0° | The dummy was sled up along the backrest. Its head was narrowly held on the top of the headrest. |
| Type C | 58.0° | The dummy was largely sled up and its breast faced almost upward. Its head rid over the headrest and largely rotated rearward. |
| Type D | 60.5° | The dummy was sled up, and at the same time, one side of the backrest was twisted rearward. Its head rid over the headrest and largely rotated rearward. |
| Example | 32.5° | The dummy was slid up a little along the backrest, but its breast and head were held on and protected by the backrest and the headrest, respectively. The side supporting parts of the back frame were largely deformed, and thereby, the rearward tilting of the backrest was restrained and the impact energy was absorbed. |

As seen in this result, the backrest becomes an impact energy absorbing structure by incorporating the supporting members into its back frame in accordance with this invention, so that its rearward tilting can be restrained and impact energy can be absorbed by deformation of the back frame when a rear impact acts on the seat. Thus, it is restrained that a passenger slides up along the backrest, and the passenger is held in the seat. In addition, a rear space behind the seat is kept so as to protect a passenger sat on a rear seat.

What is claimed is:

1. A seat comprising a seat part and a backrest attached to a rear side of said seat part, said seat part comprising: a pair of side supporting frame members connected with each other by transverse reinforcing members; and a seat cushion attached to said supporting frame members, said backrest comprising: an inverse U-shaped back frame, lower ends thereof being connected to rear ends of said side supporting frame members, respectively and a backrest cushion attached to said inverse U-shaped back frame, said inverse U-shaped back frame comprising: side supporting parts that are positioned in parallel, and a top supporting part that connects top ends of said side supporting parts, said lower ends of said side supporting parts being connected to said rear ends of said side supporting frame members via lower attaching parts, respectively, said side supporting parts having upper attaching parts proximate to said top ends; and upright supporting members having bottom ends that connect to said lower attaching parts frontward from said lower ends of said side supporting parts, respectively, and upright supporting members having upper ends that connect to said upper attaching parts, respectively.

2. The seat of claim 1 wherein when a rear impact acts on said seat, the rearward tilting of said inverse U-shaped back frame is restrained by said upright supporting members and said side supporting parts are deformed so that said side supporting parts absorb the impact energy.

3. The seat of claim 1 wherein said side supporting frame members and said inverse U-shaped back frame are connected by reclining means.

4. The seat of claim 3 wherein said reclining means is integrally fixed to said lower attaching parts.

5. The seat of claim 1 wherein said lower attaching parts are integrally fixed to said lower ends of said side supporting parts of said inverse U-shaped back frame, respectively.

6. The seat of claim 5 wherein the upper ends of said upright supporting members are pivotally connected to upper attaching parts provided in said side supporting parts, respectively, and said bottom ends of said upright supporting members are pivotally connected to of said lower attaching parts, respectively.

7. The seat of claim 5 wherein the upper ends of said upright supporting members are integrally fixed to upper attaching parts provided in said side supporting parts of said inverse U-shaped back frame, respectively, and said bottom ends of said upright supporting members are integrally fixed to said lower attaching parts, respectively.

8. The seat of claim 1 wherein said lower ends of said side supporting parts of said inverse U-shaped back frame are connected to said lower attaching parts, respectively.

9. The seat of claim 8, wherein the upper ends of said upright supporting members are pivotally connected to upper attaching parts provided in said side supporting parts, respectively.

10. The seat of claim 1 wherein thinnish parts are provided in said side supporting parts of said inverse U-shaped back frame, so that said inverse U-shaped back frame is easily deformed, said thinnish parts being positioned between attaching parts of the upper ends of said upright supporting members and said lower attaching parts, respectively.

11. The seat of claim 1 wherein each of said upright supporting members is curved.

12. A seat comprising a seat part and a backrest attached to a rear side of said seat part, said seat part comprising: a pair of side supporting frame members connected with each other by transverse reinforcing members; and a seat cushion attached to the side supporting frame members, said backrest comprising: an inverse U-shaped back frame, lower ends thereof being connected to rear ends of said side supporting frame members, respectively and a backrest cushion attached to said inverse U-shaped back frame, said inverse U-shaped back frame comprising: side supporting parts that are positioned in parallel, and a top supporting part that connects top ends of said side supporting parts, said lower ends of said side supporting parts being connected to said rear ends of said side supporting frame members via lower attaching parts, respectively, upright supporting members having bottom ends that connect to said lower attaching parts frontward from said lower ends of said side supporting parts, respectively, and wherein the upper ends of said upright supporting members are positioned frontward from said side supporting parts and are pivotally connected to upper attaching parts provided in said side supporting parts, respectively, and said bottom ends of said upright supporting members are pivotally connected to said lower attaching parts, respectively.

* * * * *